United States Patent
Jalkanen et al.

(10) Patent No.: US 10,820,267 B2
(45) Date of Patent: Oct. 27, 2020

(54) MANAGEMENT OF A CONNECTIVITY OF A MOBILE DEVICE

(71) Applicant: Telia Company AB, Stockholm (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/602,596

(22) Filed: May 23, 2017

(65) Prior Publication Data

US 2017/0339635 A1    Nov. 23, 2017

(30) Foreign Application Priority Data

May 23, 2016    (EP) ..................................... 16170833

(51) Int. Cl.
   *H04W 52/02*    (2009.01)
   *H04W 76/15*    (2018.01)
   *H04W 88/06*    (2009.01)

(52) U.S. Cl.
   CPC ... *H04W 52/0212* (2013.01); *H04W 52/0277* (2013.01); *H04W 76/15* (2018.02); *H04W 88/06* (2013.01); *Y02D 70/12* (2018.01)

(58) Field of Classification Search
   CPC ............. H04W 52/0212; H04W 76/15; H04W 52/0277; H04W 88/06; Y02D 70/12
   See application file for complete search history.

(56) References Cited

U.S. PATENT DOCUMENTS

| | | | |
|---|---|---|---|
| 6,731,957 B1* | 5/2004 | Shamoto ........... | H04W 52/0277 455/574 |
| 2007/0129045 A1 | 6/2007 | Aerrabotu | |
| 2007/0171882 A1* | 7/2007 | Lee .................. | H04W 52/0254 370/338 |
| 2008/0192666 A1* | 8/2008 | Koskan ............. | H04W 52/0261 370/311 |
| 2009/0092133 A1* | 4/2009 | Mok ................. | H04L 29/12311 370/389 |
| 2009/0325622 A1* | 12/2009 | Matsumura ......... | H04B 7/2606 455/522 |
| 2010/0056230 A1* | 3/2010 | Chan ................. | H04W 52/0264 455/574 |
| 2012/0028670 A1 | 2/2012 | Lim | |
| 2012/0120858 A1* | 5/2012 | Das ................... | H04W 52/0229 370/311 |

(Continued)

OTHER PUBLICATIONS

EP Search Report, dated Nov. 8, 2016, from corresponding EP application.

*Primary Examiner* — Ivan O Latorre
(74) *Attorney, Agent, or Firm* — Nixon & Vanderhye

(57) ABSTRACT

A method for controlling connectivity of a mobile device being connected to a first network through a first radio communication interface. The method includes triggering the mobile device to adopt a power saving mode with respect to the first network; and in response to the triggering of the adoption of the power saving mode, generating a signal for activating a second radio communication interface in order to establish a connection to a second network. A mobile device that performs the method and a computer program product with program code, that when executed on at least one processor of a computing apparatus, causes the computing apparatus to perform the method.

15 Claims, 3 Drawing Sheets

(56) References Cited

U.S. PATENT DOCUMENTS

| | | | |
|---|---|---|---|
| 2013/0237151 A1* | 9/2013 | Yu | H04B 5/00 455/41.1 |
| 2015/0319734 A1* | 11/2015 | Zhang | H04W 68/005 455/458 |
| 2016/0345262 A1* | 11/2016 | Jain | H04W 68/02 |

* cited by examiner

MANAGEMENT OF A CONNECTIVITY OF A MOBILE DEVICE

TECHNICAL FIELD

The invention concerns in general the technical field of mobile communications. More particularly, the invention concerns a management of a connectivity of a mobile device.

BACKGROUND

Use of mobile devices has increased tremendously during the last decades. The users of the mobile devices want to use their devices in continuous manner for varied purposes. This is continuously increasing due to more sophisticated mobile devices and applications developed thereto. One factor affecting the use of the mobile devices is a limited amount of energy that is possible to arrange in the mobile terminals. In other words, in order to maintain the mobility of the devices a trade-off between the size of the device (i.e. a battery) and the battery life for supplying energy to the device is to be made.

There has been developed several solutions for improving an operating time of the mobile device. Naturally, at least in some cases, it is possible to replace a battery of the mobile device with another battery having a bigger capacity than the original one. There are also introduced arrangements which enable setting up the device to a so called power save mode. The power save mode may, for example, optimize statuses of applications and other device settings, such as optimizing a brightness of a display, in order to control the use of energy so that the operating time of the mobile device may be increased.

Moreover, some 3GPP telecommunication specifications define so called UE power saving mode (PSM) for reducing its energy consumption. The power saving mode is similar to power-off, but the UE remains registered with the network and there is no need to re-attach or re-establish PDN connections. A UE in PSM is not immediately reachable for mobile terminating services i.e. the UE does not respond paging or any other network signaling. A UE using PSM is available for mobile terminating services during the time it is in connected mode and for the period of an Active Time that is after the connected mode. The connected mode is caused by a mobile originated event like data transfer or signaling, e.g. after a periodic TAU/RAU procedure. PSM is therefore intended for UEs that are expecting only infrequent mobile originating and terminating services and that can accept a corresponding latency in the mobile terminating communication. Basically, in the PSM both the UE and the network maintain all UE states, including Radio Bearers, registration state, and temporary identities, but the paging does not happen.

The prior art solutions for controlling of a connectivity of a mobile device in view of energy consumption of the mobile device are applicable as such, but there is continuous need to find further developments in the area.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a mobile device and a computer program product for managing a connectivity of the mobile device in a sophisticated way. Another objective of the invention is that the method, the mobile device and the computer program product for managing the connectivity is made so that a reachability of the user of the mobile device is maintained.

The objectives of the invention are reached by a method, a mobile device and a computer program product as defined by the respective independent claims.

According to a first aspect, a method for controlling a connectivity of a mobile device being connected to a first network through a first radio communication interface is provided, the method comprising: triggering the mobile device to adopt a power saving mode with respect to the first network; in response to the triggering of the adoption of the power saving mode generating a signal for activating a second radio communication interface in order to establish a connection to a second network.

The method may further comprise: receiving an indication of a predetermined event occurred in the first network; triggering the mobile device to return back from the power saving mode with respect to the first network; and deactivating the second radio communication interface. The predetermined event occurred in the first network may e.g. be a connection request to the mobile device over the first network.

The triggering to adopt the power saving mode may be performed in response to a detection that energy of a battery in the mobile device is below a predetermined limit.

The second radio communication interface may be selected so that it consumes less energy from the battery of the mobile device than the first radio communication interface when an activated mode.

According to a second aspect, a mobile device for controlling a connectivity of the mobile device being connected to a first network (110) through a first radio communication interface is provided, the mobile device comprising: at least one processor; at least one memory including computer program code; the at least one memory and the computer program code configured to, with the at least one processor, cause the mobile device to perform: trigger the mobile device to adopt a power saving mode with respect to the first network; and in response to the triggering of the adoption of the power saving mode generate a signal for activating a second radio communication interface in order to establish a connection to a second network.

The mobile device may further be caused to perform: receive an indication of a predetermined event occurred in the first network; trigger the mobile device to return back from the power saving mode with respect to the first network; and deactivating the second radio communication interface. The mobile device may further be caused to detect, as the predetermined event occurred in the first network, a connection request to the mobile device over the first network.

The mobile device may also be caused to perform the triggering to adopt the power saving mode in response to a detection that energy of a battery in the mobile device is below a predetermined limit.

The mobile device may comprise the second radio communication interface that consumes less energy from the battery of the mobile device than the first radio communication interface when an activated mode.

According to a third aspect, a computer program product comprising computer readable program code tangibly embodied on a non-transitory computer readable medium is provided, the program code configured to cause performing the method as described above when run on a computing apparatus.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of an environment in which at least some embodiments of the invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
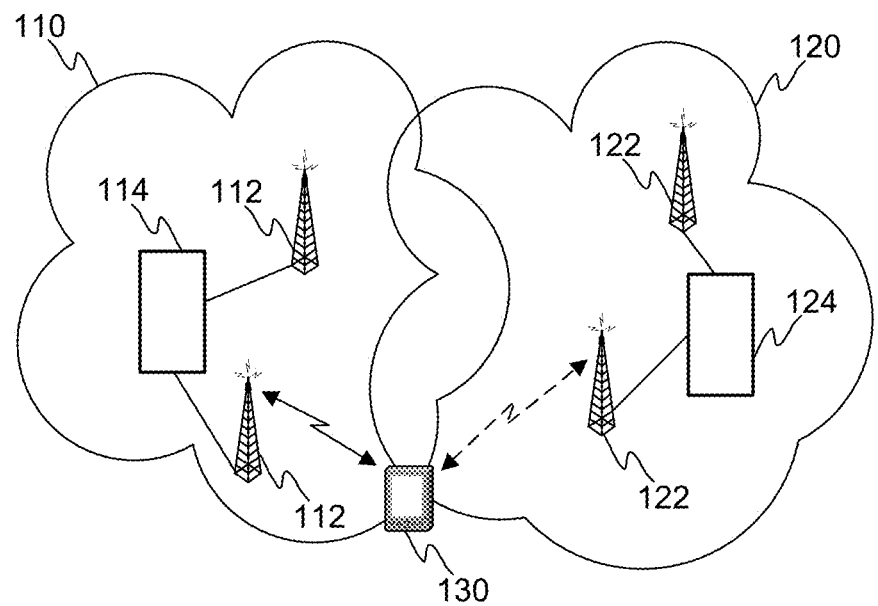

FIG. 1 illustrates schematically an example of an environment in which at least some embodiments of the invention may be implemented to. Within an area there are at least two communication networks 110, 120 capable of serving wirelessly a mobile device 130. Each communication network comprises necessary network entities, such as radio access network and core network, by means of which the wireless network service may be offered to mobile devices residing within the service area of the network in question. The radio access network may e.g. comprise base stations 112, 122 and controllers thereto and the core network may e.g. comprise a central control unit 114, 124 and necessary registers accessible at least by the central control unit 114, 124 in question. Naturally, the implementation of the networks is dependent on the network technology used. As said the implementation in FIG. 1 is a non-limiting example for a purpose to describe aspects of the present invention. For example, the mentioned network elements in one network may be configured so that they implement two different network technologies for the purpose of the present invention.

Figure 2:
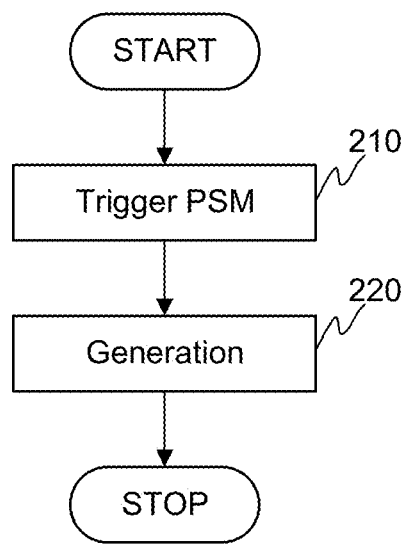
FIG. 2 illustrates schematically an example of a method according to the invention.

FIG. 2 illustrates schematically an example of the method according to the invention. As a starting point for the invention a mobile device 130 is connected to use one or more services provided by a first communication network 110, which in this case is a mobile communication network implementing a certain network technology, such as 3G or 4G, wherein the network technology is such that it may implement the power saving mode (PSM). As already mentioned in the background part the power saving mode is similar to power-off, but the mobile device 130 remains registered with the network and there is no need to re-attach or re-establish PDN connections. The mobile device in PSM is not immediately reachable for mobile terminating services.

From the mobile device 130 point of view the communication interface, such as a radio modem, implementing the corresponding network technology is activated and active, and it is controlled by a processing unit of the mobile device 130 and, thus, used for any communication with the first communication network 110. At some point the mobile device may request an adoption of the PSM 210 triggered by a predetermined event. For example, the predetermined event may relate to a monitoring of a battery residing in the mobile terminal. The operation may be arranged so that the mobile device 130 is configured to determine a value representing an energy level of the battery residing in the mobile device 130. The determination may be arranged with known methods, such as directly based on a voltage measurement of the battery or some battery fuel gauge arrangement. The outcome of the determination is a value based on which it is possible to derive information on the status of the battery charge. In other words, according to an example of the method according to the invention an energy level of the battery residing in the mobile device may be monitored by determining a value representing, either directly or indirectly, the energy level of the battery and to compare the value to a predetermined comparison value. The comparison value may be stored in a memory of the mobile device or it may be obtained from a network, such as from the first network, through an inquiry. It may turn out that the energy level of the battery has reached a predetermined level and in response to this the mobile device 130 is configured to generate a signal that activates an adoption of the PSM by requesting it from the first network 110. The request may be performed e.g. during an attach or tracking area updating procedure, in at least some network technology. The triggering of the PSM mode in relation to the energy level in the battery of the mobile device is a non-limiting example and the triggering may be based in any other event. For example, it may be arranged that the user of the mobile terminal may manually instruct the mobile device 130 to adopt the PSM which causes the mobile device to generate a signal for requesting the PSM from the first network.

According to the present invention the mobile device 130 is configured to, in response to the activation of the PSM with respect to the first network 110, to generate a signal 220 for activating a second radio communication interface in order to establish a connection to a second network 120. The second radio communication interface may e.g. be a low power radio communication interface. The low power radio communication interface implementing a network technology of the second network 120 may, according to an embodiment of the present invention, be such that it consumes less energy of the battery than the communication with the first network, preferably less than the consumption of energy at the PSM. An example of an applicable network technology for the second network is so called LPWA (Low Power Wide Area) network technology, which is designed for machine-to-machine networking environments. In the LPWA network data transfer rate is very low, as is the energy consumption of the devices that are connected to the LPWA network.

The generation of the signal that activates the low power radio communication interface and that causes the establishment of connection, e.g. through an attachment procedure specific to the second network, with the second network 120 is dependent on the activation procedure of the PSM with respect to the first network 110. The activation procedure of the PSM may in this context cover any function that causes the mobile device 130 to enter the PSM. These may be, but are not limited to an internal or external trigger to request an adoption the PSM, a delivery of the request to the first network 110, an acknowledgement from the first network 110 of the PSM, and so on.

The result of the method, as schematically illustrated in FIG. 2, is that the mobile terminal is in the PSM with respect to the first network 110 and in active connection over the second network 120. In other words, the mobile terminal is available over the first network 110 for mobile terminating services during the time it is in connected mode and for the period of an Active Time that is after the connected mode. The connected mode is caused by a mobile originated event like data transfer or signaling, e.g. after a periodic TAU/RAU procedure. On the other hand the mobile terminal 110 is available with a limited communication capability through the second network 120, such as LPWA network. The described solution enables maintaining the user of the mobile device 130 reachable even if the first network connection is in PSM mode, wherein the reachability is achieved with reduced energy consumption. This is advantageous e.g. in a situation in which the battery of the mobile device 130 is running out of energy.

Figure 3:
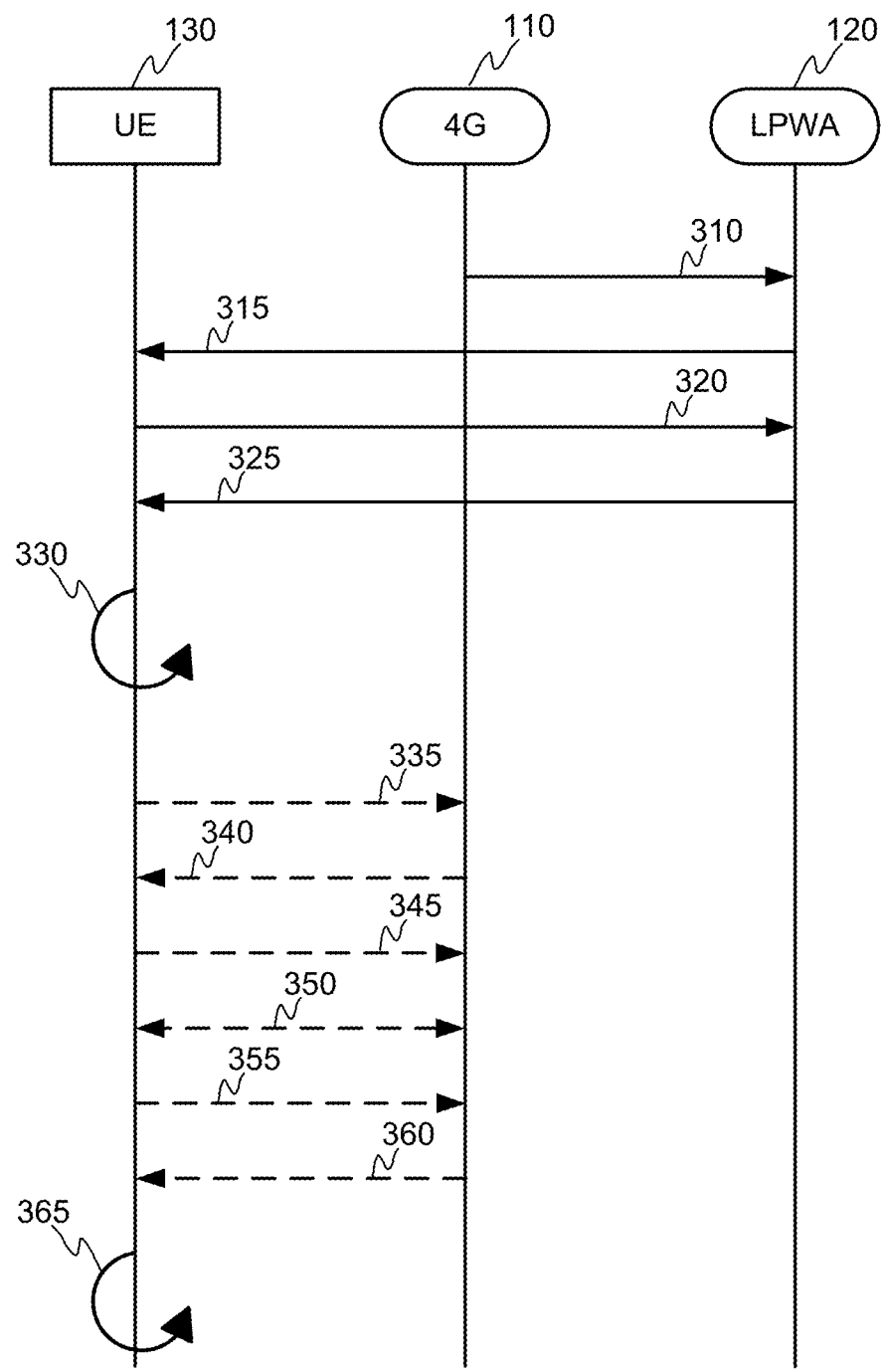
FIG. 3 illustrates schematically an example of the method as a flow chart.

The second network 120 is advantageously configured to provide at least some communication services to the mobile device 130, when the connection to the second network 120 is established. A non-limiting example of the network service which may be provided by the second network 120, such as LPWA network, is simple voice call and messaging services as e.g. defined by 3GPP, by means of which it is possible to deliver information on events, such as call connection attempts. An example of such an event is disclosed in FIG. 3 for describing some further aspects of the invention. In the example of FIG. 3 the first network 110 is a 4G mobile communication network and the second network 120 is LPWA network, and the mobile device 130 is in the power saving mode in the first network 110 and connected to second network 120 as described above. Prior to steps as illustrated in FIG. 3 a party has set up a call connection to the mobile device 130. In response to the call setup the first network 110 performs predetermined operations, such as a location inquiry of the destination party, i.e. the mobile device 130, to one or more registers, such as HLR or VLR. According to some embodiment of the invention the register may also store indication that the mobile device 130 is in the PSM and is served by the second network 120 that information may be returned as a response to the inquiry. In response to a receipt of the described information with respect to the mobile device 130 the first network 110, i.e. the network node managing the call connection, may be configured to establish and deliver a signal 130 to a network node, such a control unit, of the second network 120 and indicate that a call attempt to the mobile device 130 is initiated in the first network 110. In response to the receipt of the signal 310 the control unit of the second network 120 may be configured to page 315 the mobile device 130 residing in the operational area of the second network 130 and in response to the paging the mobile device 130 attaches 320 to the second network 120 in order to receive service from the second network 120. Now, as the mobile device 130 is in active communication connection to the second network 120 a notification 325 is delivered from the control unit, or any other network element, through a radio access part of the second network 120 to the mobile device 130 wherein the notification carries indication to the mobile device 130 that there is a mobile terminating call to the mobile device 130 in the first network. Additionally, the notification may carry further information relating to the incoming call, such as the caller information. In response to the receipt of the notification the mobile device 130 may be configured to activate 330 the communication connection with respect to the first network 110, i.e. return the mobile device 130 from PSM to a normal mode.

In response to the activation of the normal mode with respect to the first network 110 the mobile device 130 is configured to request an attachment 335 to the first network 110 and the first network 110 acknowledges the attachment 340. Next, the mobile device 130 indicates to the network that it accepts the call 345 from the caller and the call is setup 350. In case the attachment of the mobile device 130 to the first network takes so long that the caller has ended the call attempt, the first network, i.e. an applicable network node, may be configured to, in response to a receipt of the indication to accept the call 345, to initiate a call towards the caller, and in that manner establishing a call connection between the parties. At some point the call over the first network 110 ends and the mobile device 130 is configured to initiate a return to PSM. First, it signals a detach request to the first network 355 that causes the first network 110 to provide services to the mobile device 130 even though the mobile device 130 remains registered in the first network 110. The first network may acknowledge 360 the detachment to the mobile device 130. The mobile device 130 may return to the PSM 365 in order to limit the use of energy in response to the detachment and, as a result, it remains registered in the first network 110 with PSM and is connected to the second network 120.

In the example of FIG. 3, as mentioned above, the first network is 4G wireless network and the second network is LPWA network. However, the mentioned network technologies are examples for a purpose to describe the present inventive idea. Any other network technologies that provide the described advantages may be used in the context of the present invention within the limits defined in the patent claims.

Figure 4:
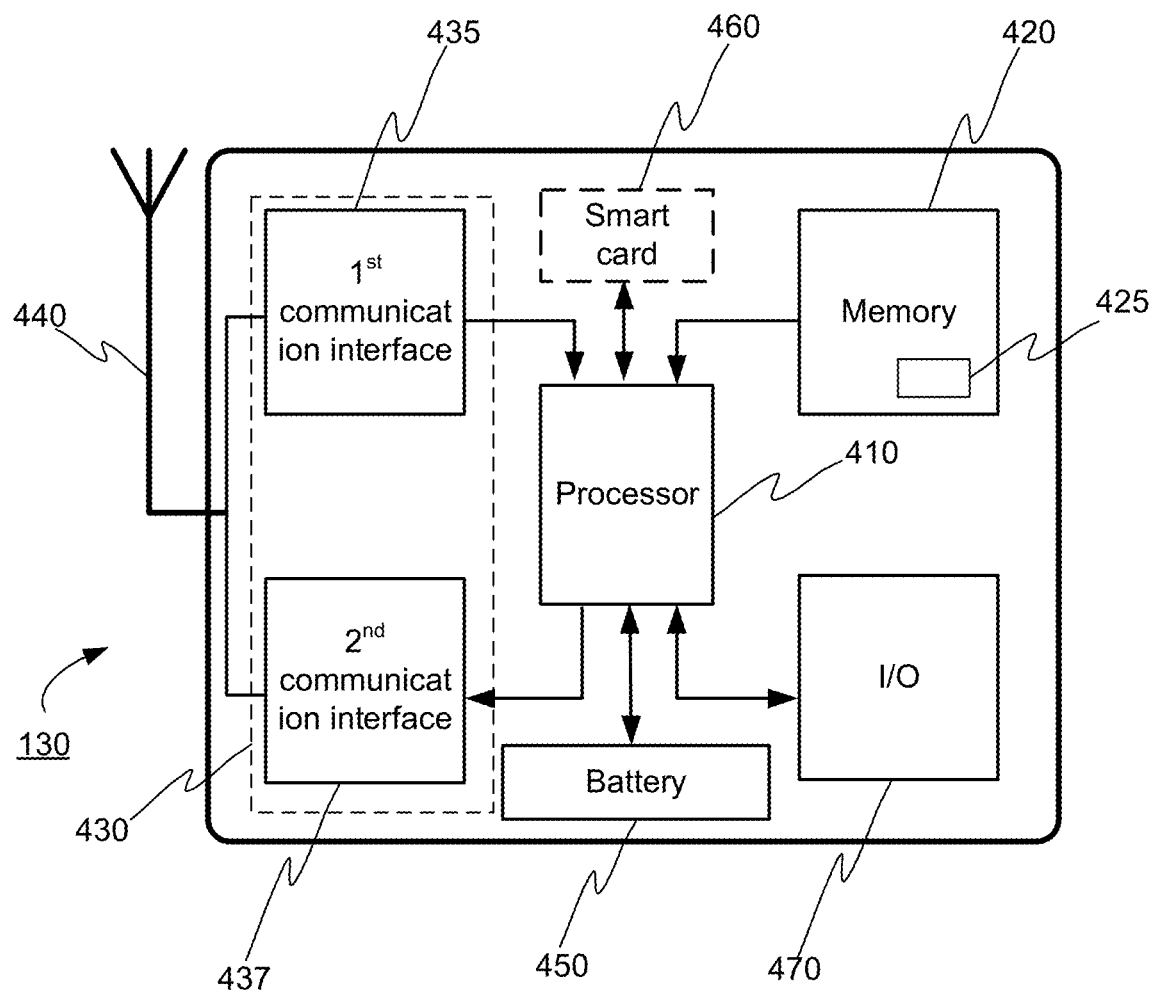
FIG. 4 illustrates schematically an example of a mobile device according to the invention.

FIG. 4 depicts, as a block diagram, some components of a mobile device 130 performing the present invention at least partly. The mobile device 130 may comprise further components or portions in addition to those shown in FIG. 4. For example, the mobile device 130 may comprise sensors configured to monitor one or more parameters having possible relation, or impact, to an operation of the mobile device 130.

The mobile device 130 of FIG. 4 comprises a processor 410 and a memory 420 for storing data and computer program code 425. The mobile device 130 may further comprise user I/O (input/output) components 470 that may be arranged, possibly together with the processor 410 and at least a portion of the computer program code 425, to provide a user interface (UI) for receiving input from a user of the mobile device 130 and/or providing output to the user of the mobile device 130. The user I/O components 470 may comprise hardware components such as a display, a touch-screen, a touchpad, a mouse, a keyboard, and/or an arrangement of one or more keys or buttons, etc. The processor 410 may be arranged to control operation of the primary monitoring device 130 e.g. in accordance with a portion of the computer program code 425 stored in the memory 420 and possibly further in accordance with the user input received via the user I/O components 480 and/or in accordance with information received via a communication portion 430 comprising at least a first and a second radio communication interfaces 435, 437. The memory 420 and a portion of the computer program code 425 stored therein may be further arranged to, with the processor 410, to provide a control portion or a control function for controlling operation of radio communication interfaces of the communication portion 430, possibly together with a control portion or a control function that may be provided within the respective radio communication interface of the communication portion 430. These control functions may be, separately or jointly, referred to as control means. Moreover, the mobile device 130 may comprise a smart card 460, such as a subscriber identity module. The smart card 460 may store information regarding to mobile network access, among other.

The references to the processor 410 of the mobile device 130 should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The communication portion 430, as already mentioned, comprises at least a first radio communication interface 435 for wireless communication with a first communication network, which first radio communication interface 435 may be employed to establish the wireless link that enables wireless connection to the first communication network 110. The communication portion 430 may further comprise a second radio communication interface 437 for wireless communication, which second radio communication interface 437 employs a wireless communication technique different from that employed by the first radio communication interface 435 and which second communication apparatus is useable for establishing the wireless link 102 that enables communication with the second communication network 120. The communication portion 430 may comprise one or more further communication apparatuses for wireless and/or wired communication with other devices. The first and second and any further radio communication interfaces comprises necessary devices and means for performing operations as described. For example, the radio communication interfaces may perform, e.g. under a control of the processor 410, operations implementing e.g. modem function towards corresponding network 110, 120, among other tasks. For the purpose of the communication the mobile device 130 may comprise one or more antennas 440 dedicated to the radio communication interfaces implemented in the mobile device 130.

The mobile device 130 may also comprise a battery 450 for providing energy for the operation of the device as described. Moreover, the mobile device 130 may comprise arrangements and devices to monitor an energy level of the battery for the purpose of some embodiment of the invention, as described earlier. The processor 410 may e.g. be responsible of obtaining a value from which it is possible to derive the energy level of the battery 450 and on that basis take further measures according to some embodiment of the present invention.

For sake of clarity although at least some of the components in the mobile device are illustrated as single components, any of the components may, however, be implemented as respective one or more separate components, some or all of which may be integrated/removable. Hence, the number of physical and operational components within each block may vary from the illustration.

Some aspects of the present invention may relate to a computer program product 425 stored in the memory 420 wherein the computer program product comprises computer-executable instructions that control the operation of the respective mobile device 130 when loaded into the respective processor 410. As an example, the computer program 425 may include one or more sequences of one or more instructions. The computer program 425 may be provided as a computer program code. The processor 410 is able to load and execute the computer program 425 by reading the one or more sequences of one or more instructions included therein from the memory 420. The one or more sequences of one or more instructions may be configured to, when executed by the processor 410, cause the mobile device 130 to carry out operations, procedures and/or functions described in the foregoing. Hence, the mobile device 130 may comprise at least one processor 410 and at least one memory 420 including computer program code for one or more programs, the at least one memory 420 and the computer program code configured to, with the at least one processor 410, cause the mobile device 130 to perform operations, procedures and/or functions described in the foregoing. The computer program code may be embodied in at least one computer-readable non-transitory medium which is accessible at least by the at least one processor 410 of the mobile device 130. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for controlling a connectivity of a mobile device to mobile networks so as to conserve an energy of the mobile device, the mobile device being connected to a first mobile network through a first radio communication interface, the method comprising:
   triggering a request, transmitted from the mobile device to the first mobile network, for the mobile device to adopt a power saving mode with respect to the first mobile network;
   following the triggering of the request, activating the power saving mode at the mobile device with respect to the first network; and
   in response to the activating of the power saving mode with respect to the first network, generating a signal for activating a second radio communication interface of the mobile device to establish a connection to a second mobile network,
   wherein the second mobile network is a wide area network that implements a low power functionality, and
   wherein activating the power saving mode causes the mobile device i) to remain registered with the first mobile network and to be available at instants of time for mobile terminating services over the first mobile network, and ii) to be in active connection over the second mobile network and reachable via the second mobile network through a signaling with at least one control unit of the second mobile network.

2. The method of claim 1, the method further comprising:
receiving an indication of a predetermined event occurred in the first mobile network;
causing, as a result of said predetermined event, the mobile device to return back from the power saving mode with respect to the first mobile network; and
deactivating the second radio communication interface.

3. The method of claim 2, wherein the predetermined event occurred in the first mobile network is a connection request to the mobile device over the first mobile network.

4. The method of claim 1, wherein the triggering is performed by the mobile device in response to a detection that energy of a battery of the mobile device is below a predetermined limit.

5. The method of claim 1, wherein the second radio communication interface consumes less energy from the battery of the mobile device than the first radio communication interface operating in an activated mode.

6. A mobile device configured to connect to and operate on mobile networks, the mobile device being connected to a first mobile network through a first radio communication interface, the mobile device comprising:
at least one processor; and
at least one memory including computer program code, the at least one memory and the computer program code configured to, upon execution by the at least one processor, cause the mobile device to:
trigger the mobile device to transmit a request to the first mobile network for the mobile device to adopt a power saving mode with respect to the first mobile network,
following the transmission of the request, activate the power saving mode at the mobile device with respect to the first network,
and
in response to the activation of the power saving mode with respect to the first network, generate a signal for activating a second radio communication interface of the mobile device to establish a connection to a second mobile network,
wherein the second mobile network is a wide area network that implements a low power functionality, and
wherein activation of the power saving mode causes the mobile device i) to remain registered with the first mobile network and to be available for mobile terminating services at instants of time over the first mobile network, and ii) to be in active connection over the second mobile network and reachable via the second mobile network through a signaling with at least one control unit of the second mobile network.

7. The mobile device of claim 6, wherein the mobile device is further caused to:
receive an indication of a predetermined event occurred in the first mobile network,
cause, as a result of said predetermined event, the mobile device to return back from the power saving mode with respect to the first mobile network, and
deactivate the second radio communication interface.

8. The mobile device of claim 7, wherein the mobile device is further caused to detect, as the predetermined event occurred in the first mobile network, a connection request to the mobile device over the first mobile network.

9. The mobile device of claim 6, wherein the mobile device is triggered to transmit the request in response to detection that energy of a battery in the mobile device is below a predetermined limit.

10. The mobile device of claim 6, wherein the second radio communication interface consumes less energy from the battery of the mobile device than the first radio communication interface operating in an activated mode.

11. A computer program product comprising computer readable program code tangibly embodied on a non-transitory computer readable medium, the program code, when executed on at least one processor of a computing apparatus, causes the computing apparatus to perform the method according to claim 1.

12. The method of claim 1, wherein the request is transmitted to the first network during an updating procedure with the first network.

13. The method of claim 12, wherein the updating procedure with the first network is either of an attach or tracking area updating procedure.

14. The mobile device of claim 6, wherein the request is transmitted to the first network during an updating procedure with the first network.

15. The mobile device of claim 14, wherein the updating procedure with the first network is either of an attach or tracking area updating procedure.

* * * * *